United States Patent
Kayamoto et al.

(10) Patent No.: US 7,549,926 B2
(45) Date of Patent: Jun. 23, 2009

(54) RUBBER ELEMENT FOR COMPRESSION ELASTIC COUPLING

(75) Inventors: Susumu Kayamoto, Kobe (JP); Takashi Horie, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 345 days.

(21) Appl. No.: 10/581,062

(22) PCT Filed: Nov. 26, 2004

(86) PCT No.: PCT/JP2004/017589

§ 371 (c)(1), (2), (4) Date: May 30, 2006

(87) PCT Pub. No.: WO2005/052400

PCT Pub. Date: Jun. 9, 2005

(65) Prior Publication Data

US 2007/0093300 A1    Apr. 26, 2007

(30) Foreign Application Priority Data

Nov. 27, 2003    (JP) .................... 2003-397609

(51) Int. Cl.
*F16D 3/68* (2006.01)

(52) U.S. Cl. ...................................... 464/85

(58) Field of Classification Search ............ 464/76, 464/83, 85, 87, 68.91; 192/209; 267/141, 267/141.7
See application file for complete search history.

(56) References Cited

U.S. PATENT DOCUMENTS

| | | | |
|---|---|---|---|
| 2,457,507 A | * | 12/1948 | Strachovsky .................. 464/85 |
| 2,964,930 A | * | 12/1960 | Aira et al. ................ 192/209 X |
| 3,112,626 A | | 12/1963 | Barone |
| 3,257,826 A | | 6/1966 | Peterson |
| 3,575,014 A | | 4/1971 | Wright |
| 4,943,261 A | | 7/1990 | Smith |
| 5,101,952 A | * | 4/1992 | Saeki et al. |
| 5,211,606 A | * | 5/1993 | Simon .......................... 464/85 |
| 5,690,553 A | * | 11/1997 | Imanaka et al. ........... 464/68.91 |
| 6,358,154 B1 | * | 3/2002 | Murrell et al. ............. 464/76 X |
| 2004/0018880 A1 | | 1/2004 | Kayamoto |

FOREIGN PATENT DOCUMENTS

| | | | | |
|---|---|---|---|---|
| DE | 492985 | * | 3/1930 | .................... 464/85 |
| DE | 24 51 214 | * | 5/1976 | .................... 464/85 |
| DE | 3432436 A1 | | 3/1986 | |
| EP | 0 937 902 A2 | | 8/1999 | |

(Continued)

*Primary Examiner*—Greg Binda
(74) *Attorney, Agent, or Firm*—Oliff & Berridge, PLC

(57) ABSTRACT

A rubber element according to the present invention includes a pair of mounting plates (2) attached respectively to a pair of rib surfaces of drive and driven ribs which are spaced and opposed to each other; and an elastic member (4) made of rubber held between the pair of mounting plates (2) which are spaced and opposed to each other and bonded to joining surfaces of the pair of mounting plates (2). The pair of mounting plates (2) are respectively provided with protrusions (3) protruding toward each other in central areas of the joining surfaces or lateral areas of the joining surfaces including the central areas and extending in a direction parallel to an axis about which flanges rotate.

16 Claims, 10 Drawing Sheets

FOREIGN PATENT DOCUMENTS

| | | |
|---|---|---|
| GB | 377454 | 7/1932 |
| JP | Y1 44-7451 | 3/1969 |
| JP | U 3-122 | 1/1991 |
| JP | A 07-027142 | 1/1995 |
| JP | A 2003-343594 | 12/2003 |

* cited by examiner

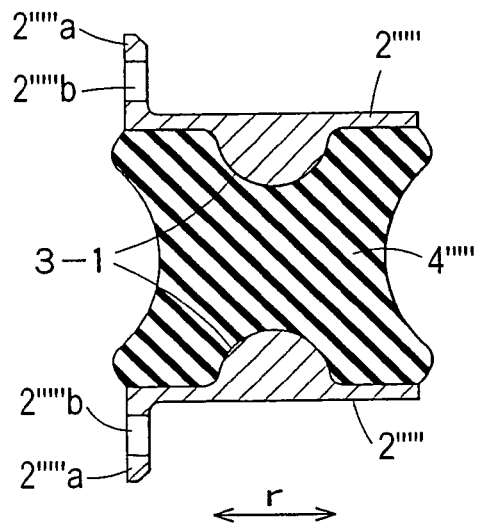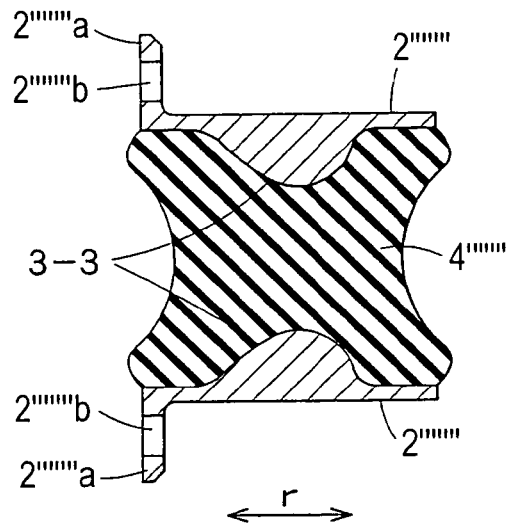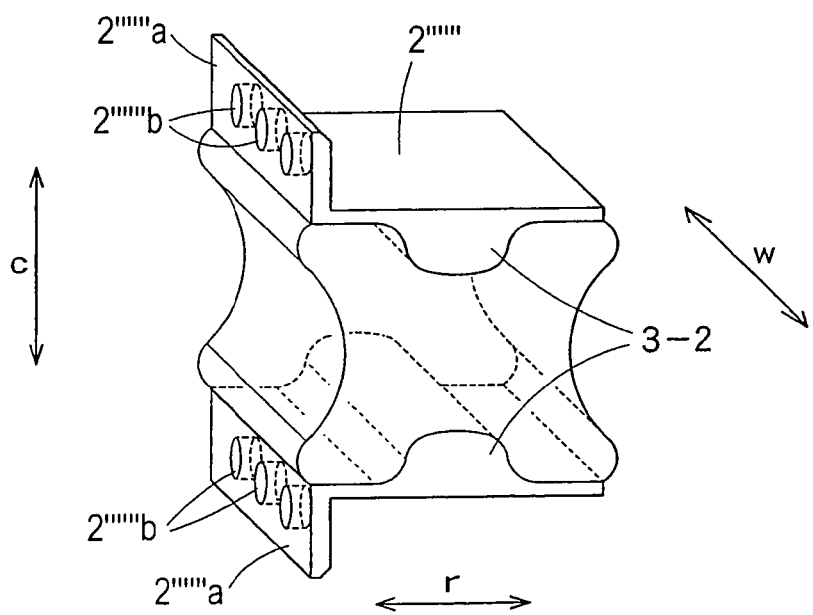
FIG. 5
FIG. 7
FIG. 6

RUBBER ELEMENT FOR COMPRESSION ELASTIC COUPLING

TECHNICAL FIELD

The present invention relates to a rubber element for a compression elastic coupling for connecting, for example, the output shaft of a diesel engine and the input shaft of a driven device, provided with elastic rubber elements which are compressed when power is transmitted from the output shaft through the compression elastic coupling to the input shaft.

BACKGROUND ART

A known two-stage torsional elastic coupling disclosed in JP 7-27142 A (Reference 1) is a compression elastic coupling of this type. This known two-stage torsional elastic coupling includes inner elastic members having a low torsional rigidity and disposed near the center of the two-stage torsional elastic coupling and outer elastic members having a high torsional rigidity and disposed in a peripheral part of the two-stage torsional elastic coupling. Power of a low torque is transmitted from a drive flange through the inner elastic members to a driven member. When load on the two-stage torsional elastic coupling is large, power is transmitted from the drive flange through both the inner and the outer elastic members to the driven member.

A known clutch mechanism disclosed in German Patent No. 3432436 (Reference 2) includes dogs and rubber elements interposed between the dogs. Each of the rubber elements includes a pair of parallel metal plates disposed opposite to each other and a rubber member sandwiched between and bonded to the metal plates. Each of the metal plates is welded to one end of a screw. The rubber element is fastened to the dog with a nut screwed on the screw.

The known two-stage torsional elastic coupling and the known clutch mechanism have the following points subject to improvement.

(1) The inner and the outer elastic members of the two-stage torsional elastic coupling mentioned in Reference 1 are solid rubber members and do not include any metal members, such as metal plates. Since the elastic members are not mechanically fastened to another member, gaps are likely to be formed between the input shaft and the output shaft and the connection of the input shaft and the output shaft is likely to be loosened by the plastic deformation of the elastic members due to aging.

(2) As shown in FIG. 13A, the rubber element of the clutch mechanism mentioned in Reference 2 is formed by bonding metal plates 30 to a rubber member 40. Screws are welded to the metal plates 30. The rubber element is interposed between a pair of dogs and the screws are fastened to the pair of dogs to hold the rubber element fixedly between the pair of dogs. Thus any play is not easily formed between the input shaft and the output shaft connected by the clutch mechanism. Although any play is not easily formed between the input shaft and the output shaft because the rubber elements are fixedly held on the dogs, the rubber member 40 of each rubber element is compressed and the rubber member 40 is caused to bulge greatly radially outward as shown in FIG. 13B when power is transmitted through the clutch mechanism. Thus the rubber member 40 is likely to be excessively deformed. The rubber member 40 adhesively bonded to the inside surfaces of the flat metal plates 30 as shown in FIG. 13A is likely to separate from the metal plates 30 when compressively deformed.

(3) In the known two-stage torsional elastic coupling and the known clutch mechanism, the hardness of the material of the elastic members, namely, the rubber members, needs to be changed by changing the material to increase the elastic modulus of the elastic member of rubber. Both the known two-stage torsional elastic coupling and the known clutch mechanism are not provided with any cooling mechanism for cooling the elastic members. Therefore, the elastic members have low fatigue strength.

DISCLOSURE OF THE INVENTION

The present invention has been made to solve the foregoing problems in the related art and it is therefore an object of the present invention to provide a rubber element for a compression elastic coupling capable of preventing looseness due to the aging of an elastic member and the resultant noise generation, of preventing fretting the joining surfaces of the input and the output shafts and mounting plates of the elastic member, of enhancing the fatigue strength of the elastic member, of facilitating the adjustment of the damping effect of a coupling and of extending the life and improving the durability of the rubber and to provide an elastic coupling provided with the rubber element.

A rubber element according to the present invention for a compression elastic coupling including a drive flange provided with a plurality of drive ribs circumferentially arranged at angular intervals and a driven flange coaxial with and spaced from the drive flange and provided with a plurality of driven ribs circumferentially arranged at angular intervals, the rubber element being adapted to be interposed between the drive rib and the driven rib so as to be compressed when power is transmitted, includes: a pair of mounting plates attached respectively to a pair of rib surfaces of the drive rib and the driven rib which are spaced and opposed to each other; and an elastic member made of rubber, the elastic member being held between the pair of mounting plates which are spaced and opposed to each other, the elastic member being bonded to joining surfaces of the pair of mounting plates. The pair of mounting plates are respectively provided with protrusions protruding toward each other in central areas of the joining surfaces or lateral areas of the joining surfaces including the central areas and extending in a direction parallel to an axis about which the flanges rotate.

The rubber element of the present invention for the compression elastic coupling is provided with the protrusions formed in the central area of the inside surfaces of the mounting plates so as to protrude toward each other. Accordingly, the amount of the elastic material, namely, rubber, necessary for forming the elastic member is less than that necessary for forming an elastic member to be held between mounting plates not provided with any protrusions. Therefore, elastic modulus (hardness) can be increased without changing the material (hardness) of the elastic member and hence the size of a part of the rubber member caused to bulge out by compressive deformation can be reduced. The elastic member is not locally strained so as to protrude radially outward and the elastic member is strained uniformly when the elastic member is compressively deformed by a compressive force as shown in FIG. 13B because the mounting plates are provided with the protrusions. Therefore, heat is generated uniformly in the rubber element, the deterioration of the elastic member due to the irregular heat generating rate distribution in the elastic member and the life of the rubber element can be extended.

Preferably, the drive flange and the driven flange are fixedly mounted, respectively, on a drive shaft and a driven shaft which are coaxially extended and axially spaced apart from each other, and each of the pair of mounting plates is provided with an attaching lug adapted to be fastened to the drive rib or the driven rib with a bolt, the attaching lug being bent and extending away from the joining surface. Preferably, the attaching lug extends perpendicularly to the joining surface of the mounting plate.

The rubber element can be surely and easily held between the ribs by fastening the attaching lugs of the mounting plates to the ribs with the bolts.

Preferably, the protrusion is circular in a plane. Preferably, a height of the protrusion decreases gradually at a peripheral part of the protrusion. Preferably, the protrusion has a shape substantially resembling a semisphere or a truncated circular cone.

The operation and effect of the rubber element will be described with reference to FIGS. 11A to 11C and FIG. 12. A protrusion 30B shown in FIG. 11B, as compared with a protrusion 30A shown in FIG. 11A, is small and is curved gently. Therefore, when an elastic member 40 held between mounting plates 30 is compressed, the elastic member 40 is strained uniformly and stress is induced uniformly in the elastic member 40 as indicated by a gently curved stress distribution curve B shown in FIG. 12 and the rubber element has an elastic modulus smaller than that of the rubber element including mounting plates provided with protrusions shown in FIG. 11A. Stress is distributed in the rubber element including the mounting plates 30 provided with the protrusions 30A shown in FIG. 11A in a stress distribution curve A shown in FIG. 12. A central part of the rubber element is strained greatly and strains in parts other than the central parts of the rubber element are smaller than those indicated by a curve C in FIG. 12 in the corresponding parts of a rubber element shown in FIG. 11C including mounting plates not provided with any protrusions. Thus the rubber element shown in FIG. 11A has a large elastic modulus. The elastic modulus can be mechanically changed by changing the dimensions of the protrusions without changing the properties and characteristics of the elastic member.

An elastic coupling can be easily adapted to deal with the torsional vibrations of a shaft system by properly designing the shape and dimensions of the protrusions of the rubber element thereof without changing the size thereof. The rubber element shown in FIG. 11B including the mounting plates 30 provided with the protrusions 30B which is uniformly strained and has a gentle stress distribution curve is used in a plant where power to be transmitted varies repeatedly in a large amplitude. The rubber element shown in FIG. 11A including the mounting plates 30 provided with the protrusions 30A having a large bonding surface in a tensioning direction is used in a plant where power to be transmitted varies infrequently and the rotation of the shaft system is reversed frequently. Thus the rubber elements are used selectively in compliance with operating conditions.

Preferably, the protrusion extends over an overall width of the mounting plate in a direction parallel to the axis about which the flanges rotate.

Preferably, a peripheral step is formed in the mounting plate by forming an overall peripheral part of the mounting plate in a reduced thickness.

The area of contact between the elastic member and the mounting plate is increased by forming the peripheral step in the mounting plate. Therefore, tensile load and compressive load applied to the elastic member can be distributed to avoid stress concentration. Consequently, damaging boundaries between the elastic member and the flat part and the circumferential step of the mounting plate can be avoided.

In a rubber element as an embodiment shown in FIG. 1C according to the present invention, which will be described later, it is desirable that a part of a step formed in a mounting plate, namely, a surface of a step in a mounting plate perpendicular to a compressing direction, is not bonded to an elastic member as shown in FIG. 2A to enable the elastic member to deform freely under a compressive load. A condition shown in FIG. 2A is the same as a condition shown in FIG. 2B where an elastic member rising on a mounting plate is subjected to tensioning and compression. Therefore, in the rubber member, shearing force acts on parts of the mounting plate and the elastic member in contact with each other in directions parallel to tensioning and compressing directions. Since displacement is dependent on the elastic modulus of the rubber element, only a strain similar to that produced when a compressive stress is induced is produced when a shearing stress is induced. Consequently, a greatly reduced stress is induced in those parts and a stress induced in the rubber element is not greater than one third of a stress that will be induced in a conventional rubber element.

Preferably, the elastic member includes a circumferential outer surface which is exposed between the pair of mounting plates, the circumferential outer surface being formed to be bulged slightly outward near the pair of mounting plates and slightly depressed at a middle part of the circumferential outer surface.

When the elastic member of this rubber element is compressed by a rated load, the middle part of elastic member bulges slightly, so that the periphery of the elastic member becomes flat. The concave periphery of the elastic member has an increased area effective in dissipating heat and improves cooling effect. A large, deep depression is likely to be formed in a part of the periphery of the elastic member of a conventional rubber element under the same condition, and the part in which the large, deep depression is formed is likely to be damaged and cracks are likely to develop in the same part.

Preferably, a threaded hole in which a fixing bolt is to be screwed is formed so as to extend through a central part of an outer surface of the mounting plate into the protrusion. Moreover, the threaded hole preferably has a flat bottom.

In this rubber element, the threaded hole can be extended into the protrusion. If the bottom of the threaded hole is tapered, the threaded part of the threaded hole needs to be formed inevitably in a short length. When the bottom of the threaded hole is flat, the threaded part can be formed in a sufficiently long effective length. Therefore, it is possible to deal flexibly with the change of the height of the protrusion. Preferably, the bottom of the threaded hole is flat and round.

Preferably, the mounting plate has a substantially rectangular shape and the elastic member has a shape substantially resembling a rectangular solid. Moreover, the mounting plate preferably has a shape substantially resembling a square.

Preferably, the mounting plate is made of a metal.

Preferably, the elastic member is bonded to the joining surfaces of the mounting plates by curing.

In order to solve the problems mentioned above, the present invention provides a compression elastic coupling including a drive flange provided with a plurality of drive ribs circumferentially arranged at angular intervals; a driven flange coaxial with and spaced from the drive flange, the driven flange being provided with a plurality of driven ribs circumferentially arranged at angular intervals; and a plurality of rubber elements as mentioned above which are respectively interposed between the drive ribs and the driven ribs.

The rubber elements of the compression elastic coupling of the present invention have the following excellent effects.

1) The protrusions can prevent the excessive expansion of the rubber element and the excessive deformation of the elastic member. Therefore, the compression elastic coupling can be formed in a small diameter, permanent strain produced in the elastic member by the long, continuous use of the compression elastic coupling can be reduced and the compression elastic coupling has high fatigue strength and a long life.

2) The protrusions having the smoothly curved surfaces can avoid stress concentration and stress distribution and strain in the rubber element can be adjusted by changing the width and the height of the protrusions without changing the physical properties of the elastic member.

3) The area of contact between the elastic member and the mounting plate can be increased by forming the circumferential step in the mounting plate, the part in contact with the elastic member is formed in a direction parallel to the directions in which the rubber element is tensioned and compressed to distribute load during variation. Thus stress concentration on parts of the mounting plate and the elastic member in contact with each other can be eased and damaging the surface of the elastic member can be suppressed even under severe conditions.

4) A circumferential outer part of the rubber element included in the compression elastic coupling is caused to bulge out by high compression and a part of the elastic member in contact with the mounting plate and a central part of the elastic member are likely to be differently deformed. In the rubber element of the present invention, the protrusions make the elastic member bulged smoothly and hence power can be efficiently transmitted from the driving side to the driven side.

BRIEF DESCRIPTION OF THE DRAWINGS

FIG. 5 is a sectional view of a rubber element in a fifth embodiment according to the present invention;

FIG. 6 is a partly sectional perspective view of a rubber element in a sixth embodiment according to the present invention;

FIG. 7 is a sectional view of a rubber element in a seventh embodiment according to the present invention;

BEST MODE FOR CARRYING OUT THE INVENTION

Rubber elements in preferred embodiments according to the present invention for a compression elastic coupling will be described in connection with the accompanying drawings.

Figure 8:
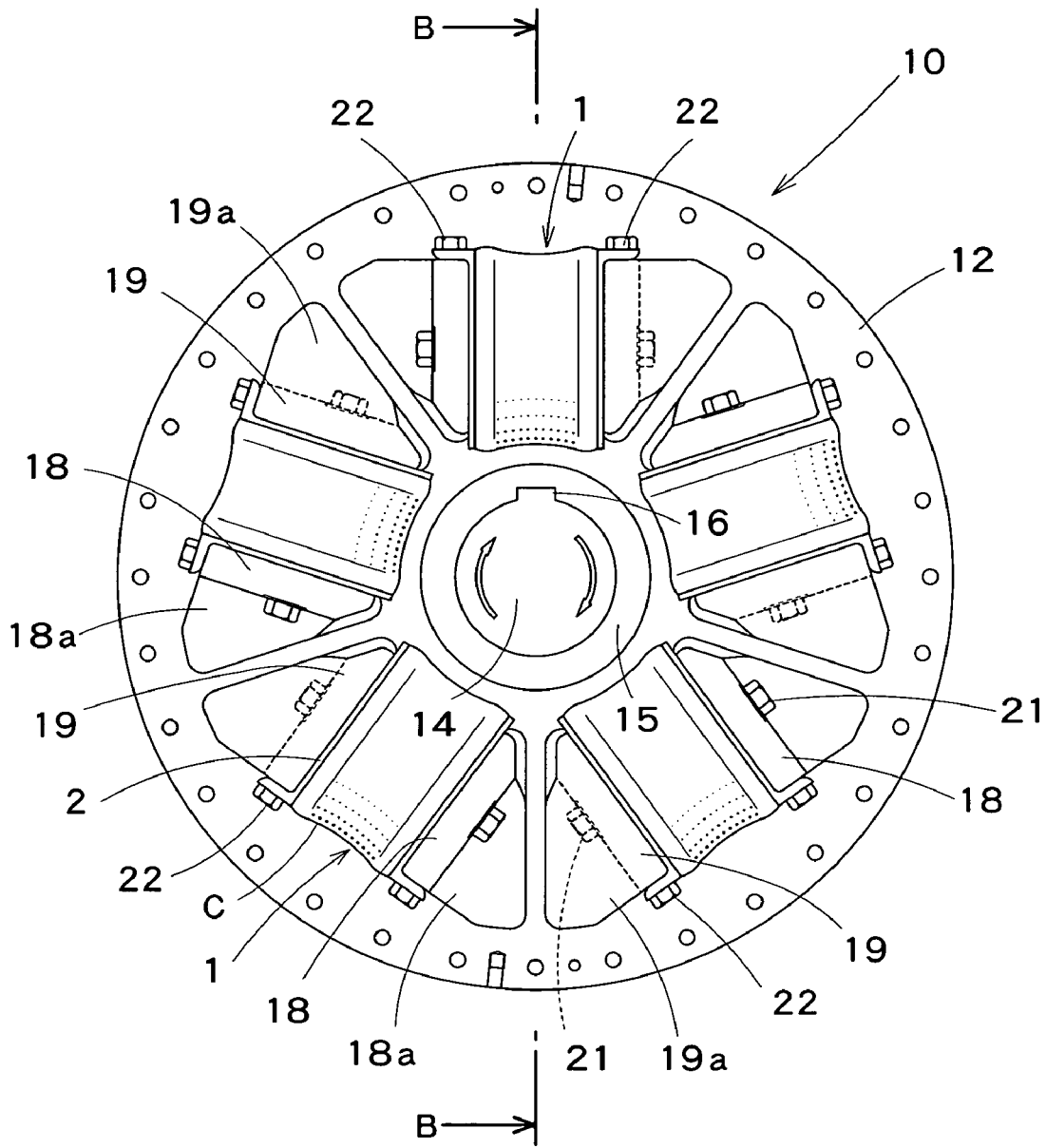
FIG. 8 is a sectional view taken on the line A-A in FIG. 9 of a compression elastic coupling including the rubber elements in the first embodiment and used for connecting the drive shaft of a diesel engine and the input shaft of a generator.
Figure 9:
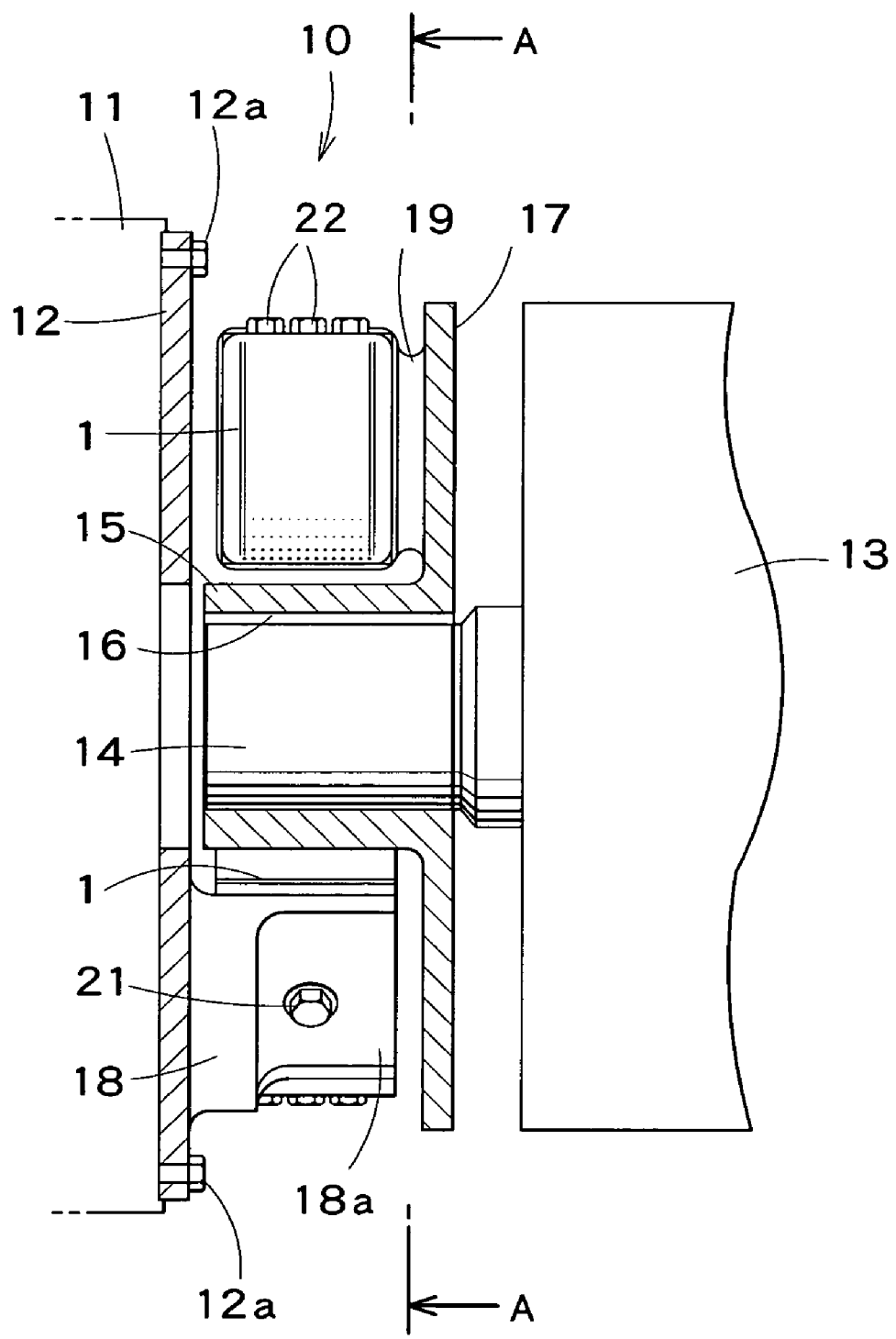
FIG. 9 is a sectional view taken on the line B-B in FIG. 8.
Figure 10:
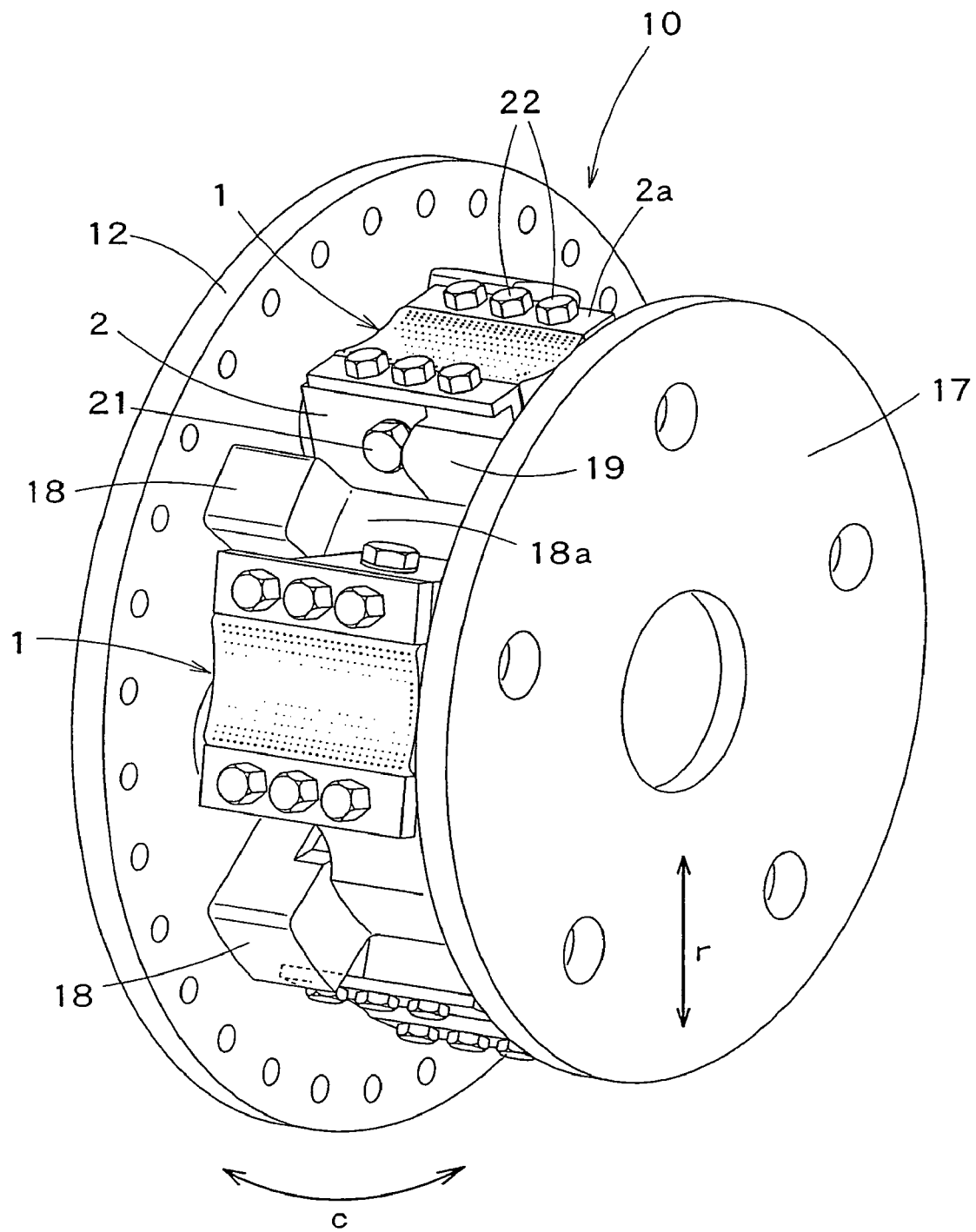
FIG. 10 is a schematic perspective view of the compression elastic coupling shown in FIG. 8 including the rubber elements of the present invention.
Figure 11A:
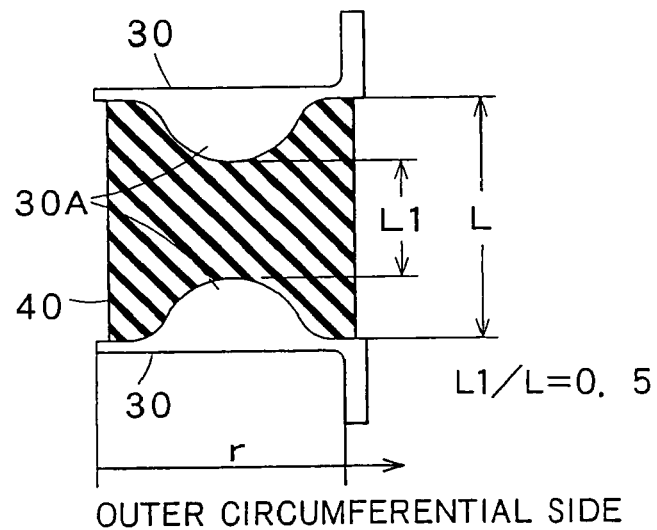
FIG. 11A is a sectional view of a rubber element according to the present invention, in which the ratio of the distance between protrusions to the width of a rubber member is 0.5.
Figure 11B:
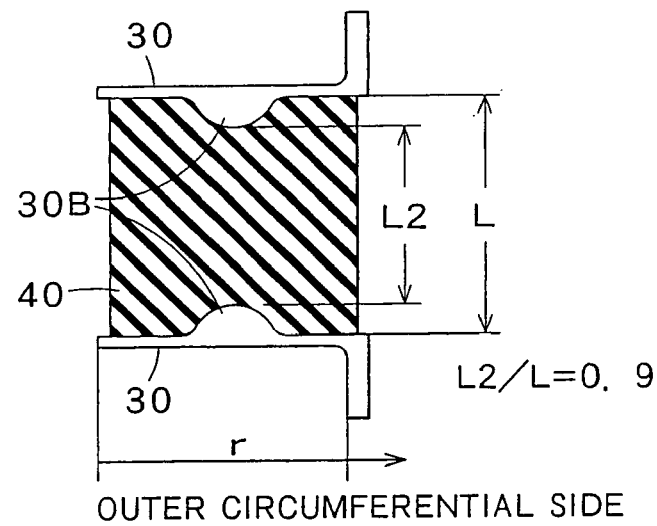
FIG. 11B is a sectional view of a rubber element according to the present invention, in which the ratio of the distance between protrusions to the width of a rubber member is 0.9.
Figure 11C:
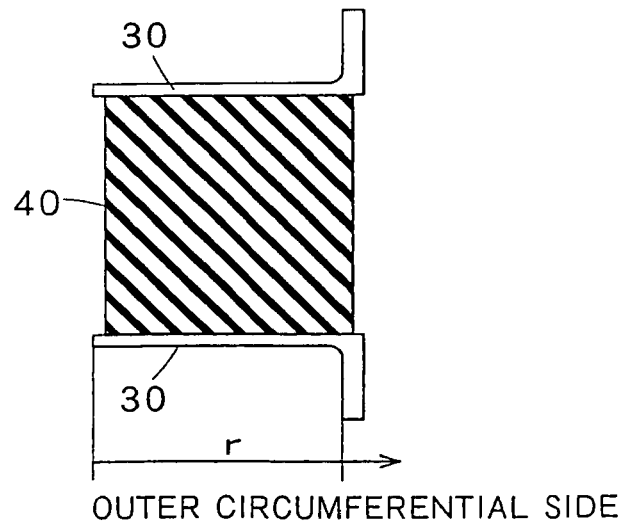
FIG. 11C is a sectional view of a rubber element not having any protrusions.
Figure 12:
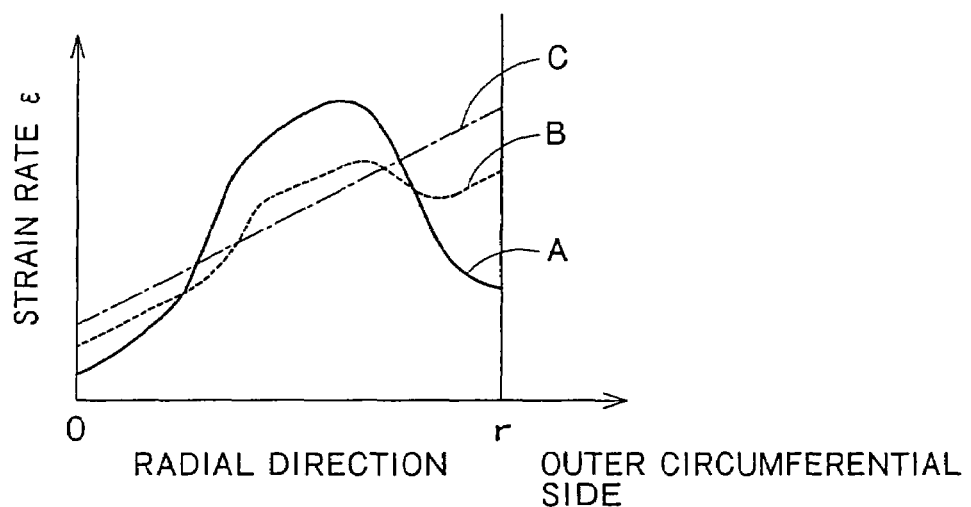
FIG. 12 is a diagram showing variations of strain in middle parts with respect to width of rubber elements shown in FIGS. 11A to 11C along radial distance under a rated compressive force.
Figure 13A:
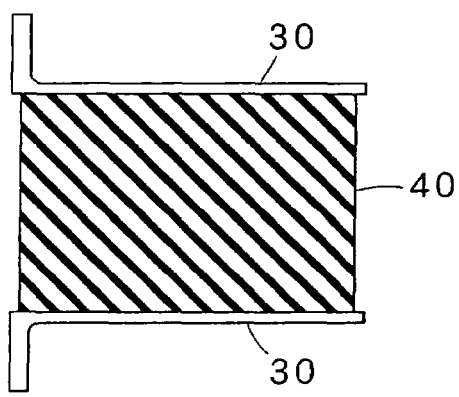
FIG. 13A is a sectional view of a rubber element not having any protrusions.
Figure 13B:
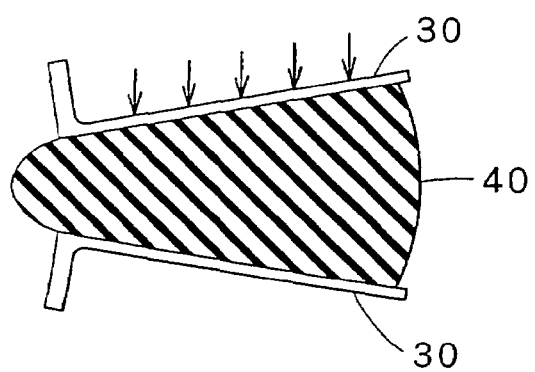
FIG. 13B is a sectional view of the rubber element shown in FIG. 13A under a compressive force.

Referring to FIGS. 8 to 10, a compression elastic coupling 10 embodying the present invention is used for connecting a drive shaft, not shown, and a driven shaft 14 to transmit power from the drive shaft to the driven shaft 14. A flywheel 11 is formed integrally with a free end part of the drive shaft. An annular drive flange 12 is fastened to the flywheel 11 with a plurality of bolts 12a arranged in a circumferential direction c at equal angular intervals. The driven shaft 14 of the generator 13 is disposed coaxially with the drive shaft at a predetermined axial distance from the drive flange 12. The driven shaft 14 is supported for rotation. The driven shaft 14 is fitted in a tubular boss 15 formed integrally with a driven flange 17. A key 16 is inserted between the driven shaft 14 and the boss 15 to prevent relative rotation thereof. The diameter of the driven flange 17 is slightly smaller than that of the drive flange 12.

The drive flange 12 is provided with drive ribs 18 (five drive ribs 18 in this embodiment). The drive ribs 18 are arranged in the circumferential direction c at equal angular intervals so as to project toward the driven flange 17. The drive ribs 18 have a substantially triangular section. The driven flange 17 is provided with driven ribs 19 (five driven ribs 19 in this embodiment). The driven ribs 19 are arranged in the circumferential direction c at equal angular intervals so as to project toward the drive flange 12. The driven ribs 19 have a substantially triangular section. Each of rubber elements 1 is fitted radially inward in a space C between the respective, opposed, parallel surfaces of the drive rib 18 and the driven rib 19. Each rubber element 1 is fastened to the drive rib 18 and the driven rib 19 with bolts.

Figure 1A:
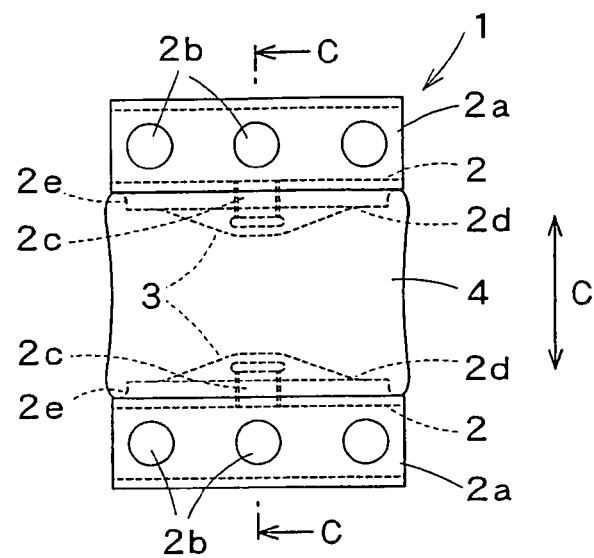
FIG. 1A is a side elevation of a rubber element in a first embodiment according to the present invention.
Figure 1B:
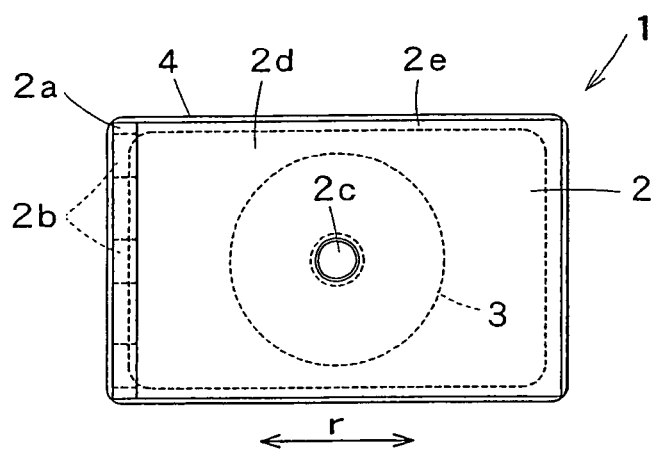
FIG. 1B is a plan view of the rubber element in the first embodiment.
Figure 1C:
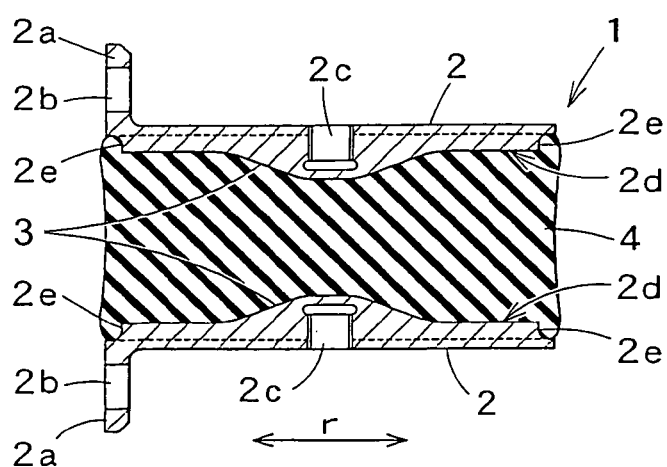
FIG. 1C is a sectional view taken on the line C-C in FIG. 1A.

Referring to FIGS. 1A to 1C, each rubber element 1 includes a rubber member (elastic member) 4 made of natural rubber in a shape substantially resembling a rectangular solid, and a pair of rectangular mounting plates 2 opposed to each other. As shown in FIG. 1C, the mounting plate 2 has an L-shaped cross section. An attaching lug 2a is formed by perpendicularly bending an outer end part of the mounting plate 2. The attaching lug 2a is provided with holes arranged at fixed intervals. The mounting plates 2 are provided in substantially central parts of their opposed inner surfaces with protrusions 3 protruding toward each other, respectively. Each of the protrusions 3 has a shape substantially resembling a truncated circular cone having a general sectional shape resembling a circular segment, having a gently curved surface and not having corners.

A threaded hole 2c is extended through a middle part with respect to a radial direction of each mounting plate 2 into the protrusion 3. A fastening screw 21 is screwed in the threaded hole 2c. The bottom of the threaded hole 2c is round and flat. As shown in FIGS. 1A to 1C, a peripheral part 2e of the inner surface of each mounting plate 2 extending along the sides of the mounting plate 2 is sunk below the level of a flat part 2d surrounded by the peripheral part 2e. The rubber member 4, namely, an elastic member, is bonded to the respective, opposed, inner surfaces of the pair of mounting plates 2 by curing.

The rubber member 4 is a shape substantially resembling a rectangular solid. As shown in FIGS. 1A and 1C, parts near the mounting plates 2, of the outer surface of the rubber member 4 extending between the pair of mounting plates 2 are bulged outward in a convex shape and a middle part of the same is depressed in a concave shape. The rubber member 4 is formed in such a shape by molding natural rubber, namely, an elastic material, in a mold. As shown in FIG. 1B, the four corners of the peripheral part 2e of each mounting plate 2 are rounded.

The rubber element 1 is thus built. The rubber element 1 is inserted radially inward in the space C between the drive rib 18 and the driven rib 19. Bolts 22 are passed through the holes 2b formed in the attaching lugs 2a and are screwed in threaded holes, not shown, formed in the outer end surfaces of the drive rib 18 and the driven rib 19 to fasten the rubber element 1 to the drive rib 18 and the driven rib 19. The drive rib 18 and the driven rib 19 are provided with recesses 18a and 19a, respectively. Through holes, not shown, having axes perpendicular to the mounting plates 2 are formed in the recesses 18a and 19a, respectively. The fastening screws 21 are passed through the holes and are screwed in the threaded holes 2c of the mounting plates 2 to hold the mounting plates 2 in close contact with the respective inner surfaces of the ribs 18 and 19.

Figure 2A:
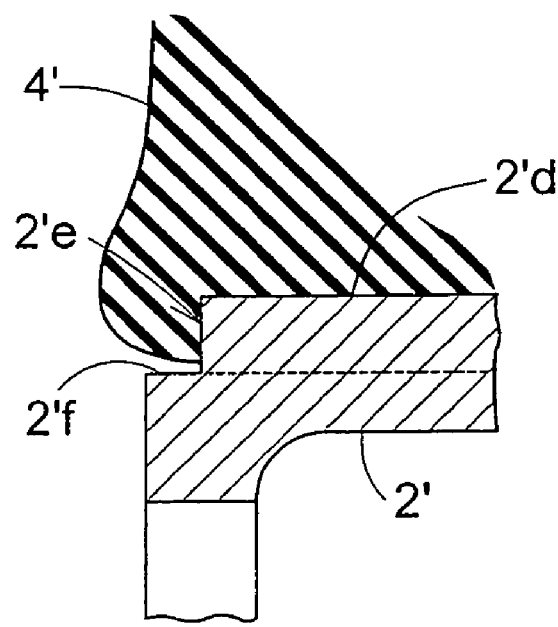
FIG. 2A is an enlarged sectional view of a part of a rubber element in a second embodiment according to the present invention where a mounting plate and a rubber member are bonded together.
Figure 2B:
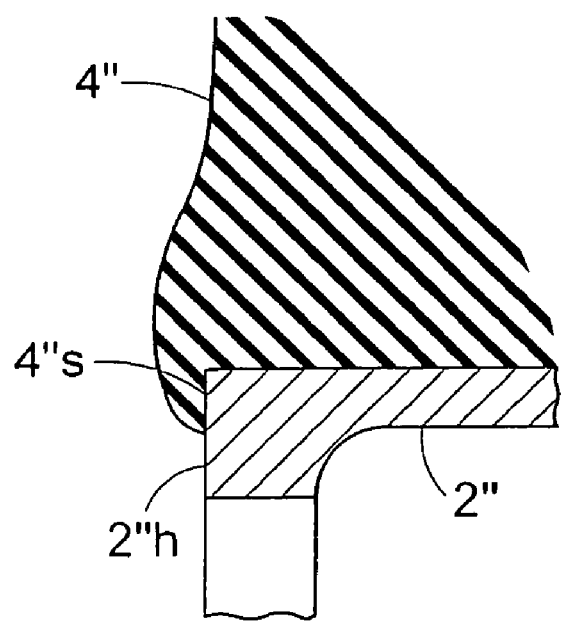
FIG. 2B is an enlarged, fragmentary sectional view of another rubber element capable of exercising the same actions as those of the elastic element shown in FIG. 2A.

FIG. 2A is an enlarged sectional view of a part of a rubber element in a second embodiment according to the present invention where a rubber member 4' is bonded to a peripheral part 2'e of a mounting plate 2'. The rubber element in the second embodiment differs from the rubber element 1 in the first embodiment in that the rubber member 4' is not bonded to a vertical surface 2'f of the peripheral part 2'e as shown in FIG. 2A. When the rubber member 4' is compressed, a part of the rubber member 4' is allowed to deform freely. Such a deformation of the rubber member 4' is similar to that of a rubber member 4" having a part 4"s extending over the end surface 2"h of the mounting plate 2" as shown in FIG. 2B is tensioned or compressed. The part 4"s of the rubber member 4" in contact with the end surface 2"h of the mounting plate 2" undergoes shearing force acting in a direction parallel to the tensioning and compressing directions. Since displacement is dependent on the elastic modulus of the rubber element, only a strain similar to that produced when a compressive stress is induced is produced when a shearing stress is induced. Therefore, a greatly reduced stress is induced in the part 4"s of the rubber member 4". The stress that will be induced in the part 4"s of the rubber member 4" is not greater than one third of a stress that will be induced in a conventional rubber element.

Figure 3A:
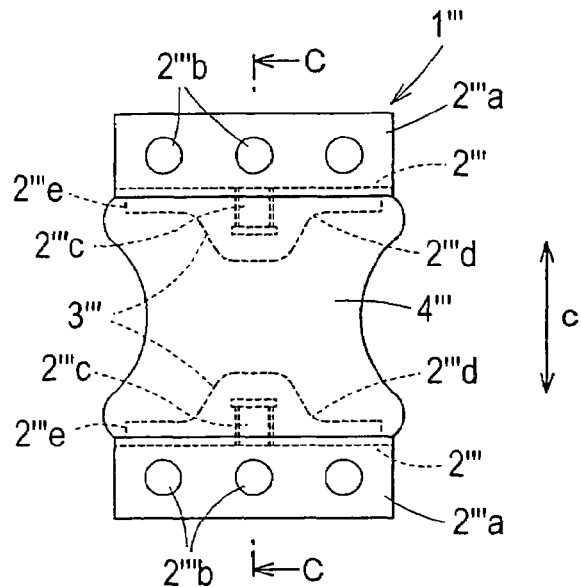
FIG. 3A is a side elevation of a rubber element in a third embodiment according to the present invention.
Figure 3B:
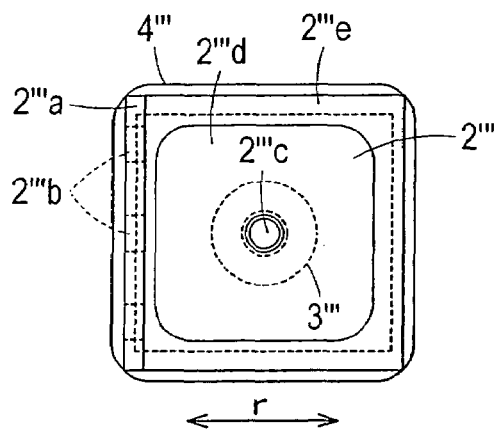
FIG. 3B is a plan view of the rubber element in the third embodiment.
Figure 3C:
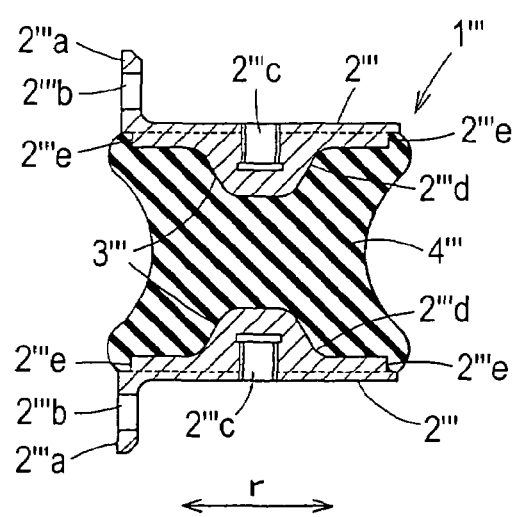
FIG. 3C is a sectional view taken on the line C-C in FIG. 3A.

FIGS. 3A to 3C show a rubber element 1''' in a third embodiment according to the present invention. The rubber element 1''' in the third embodiment is basically the same as the rubber element 1 in the first embodiment and differs from the rubber element 1 in the first embodiment only in that mounting plates 2''' thereof are square and has a radial dimension smaller than that of the mounting plates 2 of the rubber element 1 in the first embodiment.

Figure 4A:
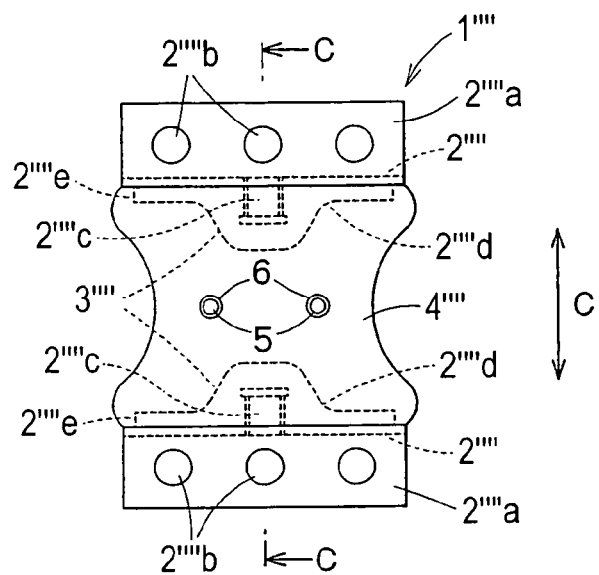
FIG. 4A is a side elevation of a rubber element in a fourth embodiment according to the present invention.
Figure 4B:
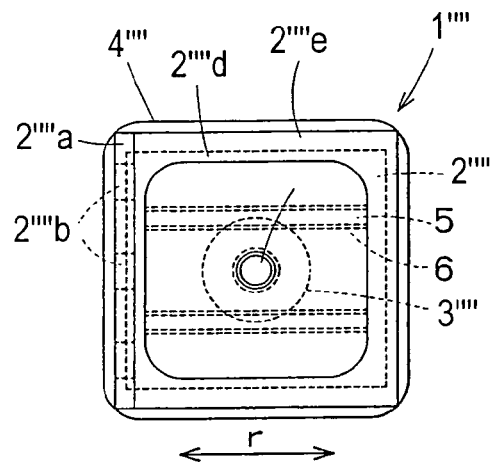
FIG. 4B is a plan view of the rubber element in the fourth embodiment.
Figure 4C:
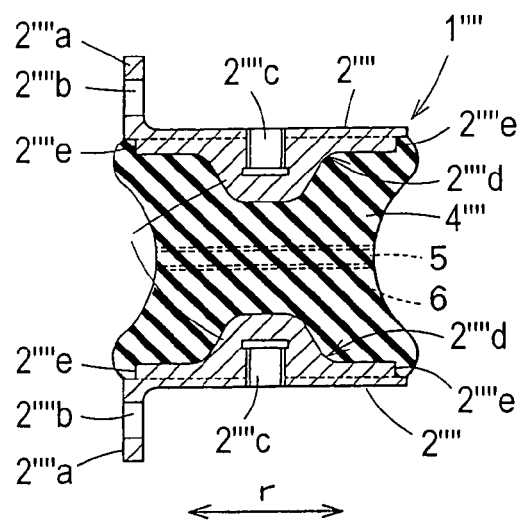
FIG. 4C is a sectional view taken on the line C-C in FIG. 4A.

FIGS. 4A to 4C show a rubber element 1'''' in a fourth embodiment according to the present invention. The rubber element 1'''' in the fourth embodiment includes a rubber member 4'''' provided with a plurality of through holes 5, and metal sleeves 6 fitted in the through holes 5 to form cooling air passages. The rubber element 1'''' in the fourth embodiment is the same as the rubber element 1''' in the third embodiment in other respects.

FIG. 5 is a sectional view of a rubber element in a fifth embodiment according to the present invention. The rubber element in the fifth embodiment differs from the rubber elements in other embodiments in that mounting plates 2''''' thereof are provided with semispherical protrusions 3-1, respectively. In FIG. 5, parts like or corresponding to those of the other embodiments are designated by similar reference characters and the description thereof will be omitted.

FIG. 6 is a partly sectional perspective view of a rubber element in a sixth embodiment according to the present invention. The rubber element in the sixth embodiment differs from other embodiments only in that mounting plates 2'''''' thereof are provided respectively with ridges 3-2 having a substantially rectangular cross section in middle parts of the inner surfaces thereof with respect to a radial direction r and extending between the opposite sides thereof in a direction w parallel to the width thereof extending in parallel to an axis about which flanges rotate. In FIG. 6, parts like or corresponding to those of the other embodiments are designated by similar reference characters and the description thereof will be omitted.

FIG. 7 is a sectional view of a rubber element in a seventh embodiment according to the present invention. The rubber element in the seventh embodiment differs from other embodiments only in that mounting plates 2''''''' thereof are provided respectively, instead of semispherical protrusions, with teardrop-shaped protrusions 3-3 having an asymmetric cross section gradually sloping radially outward in a radial direction r in central parts of the inner surfaces thereof. In FIG. 7, parts like or corresponding to those of the other embodiments are designated by similar reference characters and the description thereof will be omitted.

A rubber element in a modification of the first or the third embodiment may include mounting plates similar to those of the rubber elements shown in FIGS. 5 to 7 not having any parts like the stepped peripheral part 2e and the stepped peripheral part 2'''e.

The compression elastic coupling 10 shown and described herein provided with the rubber elements of the present invention is only an example. The rubber elements of the present invention may be applied to compression elastic couplings other than the compression elastic coupling 10.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

The invention claimed is:

1. A rubber element for a compression elastic coupling including a drive flange provided with a plurality of drive ribs circumferentially arranged at angular intervals and a driven flange coaxial with and spaced from the drive flange and provided with a plurality of driven ribs circumferentially arranged at angular intervals, the rubber element being adapted to be interposed between the drive rib and the driven rib so as to be compressed when power is transmitted, comprising:
- a pair of mounting plates attached respectively to a pair of rib surfaces of the drive rib and the driven rib which are circumferentially spaced and opposed to each other; and
- an elastic member made of rubber, the elastic member being held between the pair of mounting plates which are spaced and opposed to each other, the elastic member being bonded to joining surfaces of the pair of mounting plates;
- wherein the pair of mounting plates are respectively provided with protrusions protruding toward each other in central areas of the joining surfaces or lateral areas of the joining surfaces including the central areas, the lateral areas of the joining surfaces extending in a direction parallel to an axis about which the flanges rotate,
- wherein the elastic member includes a circumferential outer surface which is exposed between the pair of mounting plates, the circumferential outer surface being formed to be bulged outward near the pair of mounting plates and depressed at a middle part of the circumferential outer surface.

2. The rubber element for a compression elastic coupling according to claim 1, wherein the protrusion is circular in a plane.

3. The rubber element for a compression elastic coupling according to claim 2, wherein a height of the protrusion decreases gradually at a peripheral part of the protrusion.

4. The rubber element for a compression elastic coupling according to claim 2, wherein the protrusion has a shape substantially resembling a semisphere.

5. The rubber element for a compression elastic coupling according to claim 2, wherein the protrusion has a shape substantially resembling a truncated circular cone.

6. The rubber element for a compression elastic coupling according to claim 1, wherein the protrusion extends over an overall width of the mounting plate in a direction parallel to the axis about which the flanges rotate.

7. The rubber element for a compression elastic coupling according to claim 1, wherein a peripheral step is formed in the mounting plate by forming a peripheral part of the mounting plate in a reduced thickness.

8. The rubber element for a compression elastic coupling according to claim 1, wherein the mounting plate has a substantially rectangular shape and the elastic member has a shape substantially resembling a rectangular solid.

9. The rubber element for a compression elastic coupling according to claim 8, wherein the mounting plate has a shape substantially resembling a square.

10. The rubber element for a compression elastic coupling according to claim 1, wherein the mounting plate is made of a metal.

11. The rubber element for a compression elastic coupling according to claim 1, wherein the elastic member is bonded to the joining surfaces of the mounting plates by curing.

12. A compression elastic coupling comprising:
- a drive flange provided with a plurality of drive ribs circumferentially arranged at angular intervals;
- a driven flange coaxial with and spaced from the drive flange, the driven flange being provided with a plurality of driven ribs circumferentially arranged at angular intervals; and
- a plurality of rubber elements as defined in claim 1 which are respectively interposed between the drive ribs and the driven ribs.

13. A rubber element for a compression elastic coupling including a drive flange provided with a plurality of drive ribs circumferentially arranged at angular intervals and a driven flange coaxial with and spaced from the drive flange and provided with a plurality of driven ribs circumferentially arranged at angular intervals, the rubber element being adapted to be interposed between the drive rib and the driven rib so as to be compressed when power is transmitted, comprising:
- a pair of mounting plates attached respectively to a pair of rib surfaces of the drive rib and the driven rib which are circumferentially spaced and opposed to each other; and
- an elastic member made of rubber, the elastic member being held between the pair of mounting plates which are spaced and opposed to each other, the elastic member being bonded to joining surfaces of the pair of mounting plates;
- wherein the pair of mounting plates are respectively provided with protrusions protruding toward each other in central areas of the joining surfaces or lateral areas of the joining surfaces including the central areas, the lateral areas of the joining surfaces extending in a direction parallel to an axis about which the flanges rotate,
- the drive flange and the driven flange are fixedly mounted, respectively, on a drive shaft and a driven shaft which are coaxially extended and axially spaced apart from each other, and
- each of the pair of mounting plates is provided with an attaching lug adapted to be fastened to the drive rib or the driven rib with a bolt, the attaching lug being bent and extending away from the joining surface.

14. The rubber element for a compression elastic coupling according to claim 13, wherein the attaching lug extends perpendicularly to the joining surface of the mounting plate.

15. A rubber element for a compression elastic coupling including a drive flange provided with a plurality of drive ribs circumferentially arranged at angular intervals and a driven flange coaxial with and spaced from the drive flange and provided with a plurality of driven ribs circumferentially arranged at angular intervals, the rubber element being adapted to be interposed between the drive rib and the driven rib so as to be compressed when power is transmitted, comprising:
- a pair of mounting plates attached respectively to a pair of rib surfaces of the drive rib and the driven rib which are circumferentially spaced and opposed to each other; and
- an elastic member made of rubber, the elastic member being held between the pair of mounting plates which are spaced and opposed to each other, the elastic member being bonded to joining surfaces of the pair of mounting plates;
- wherein the pair of mounting plates are respectively provided with protrusions protruding toward each other in central areas of the joining surfaces or lateral areas of the joining surfaces including the central areas, the lateral areas of the joining surfaces extend extending in a direction parallel to an axis about which the flanges rotate, and
- a threaded hole in which a fixing bolt is to be screwed is formed so as to extend through a central part of an outer surface of the mounting plate into the protrusion.

16. The rubber element for a compression elastic coupling according to claim 15, wherein the threaded hole has a flat bottom.

* * * * *